(12) United States Patent
Ribak

(10) Patent No.: US 7,075,698 B2
(45) Date of Patent: Jul. 11, 2006

(54) VARIABLE LENSLET ARRAY

(75) Inventor: Erez N. Ribak, Haifa (IL)

(73) Assignee: Technion Research and Development Foundation, Ltd., Haifa (IL)

( * ) Notice: Subject to any disclaimer, the term of this patent is extended or adjusted under 35 U.S.C. 154(b) by 0 days.

(21) Appl. No.: 10/138,694

(22) Filed: May 3, 2002

(65) Prior Publication Data

US 2003/0206327 A1    Nov. 6, 2003

(51) Int. Cl.
*G02F 1/11*    (2006.01)
*G02F 1/33*    (2006.01)

(52) U.S. Cl. ..................... 359/285; 359/305

(58) Field of Classification Search ........ 359/285–287, 359/311–314, 323, 305; 356/400, 121; 250/201.9
See application file for complete search history.

(56) References Cited

U.S. PATENT DOCUMENTS

| | | | | |
|---|---|---|---|---|
| 4,490,039 A | * | 12/1984 | Bruckler et al. | 356/121 |
| 4,500,175 A | * | 2/1985 | Schaff et al. | 359/311 |
| 4,786,124 A | * | 11/1988 | Stone et al. | 359/15 |
| 5,890,789 A | * | 4/1999 | Inagaki et al. | 359/305 |
| 6,647,196 B1 | * | 11/2003 | Kouta | 385/129 |
| 2002/0054725 A1 | * | 5/2002 | Ivtsenkov et al. | 385/7 |

OTHER PUBLICATIONS

E. Ribak and E. Gazit in "Simple non-polarizing High-Frequency Modulator for Interferometry", Journal of Physics E 14, 804 (Jan. 9, 1981).
W.G. Driscoll, Ed., William Vaughan, Assoc. Ed. "Handbook of Optics", McGraw-Hill, NY, 1978.
Robert K. Tyson, "Principles of adaptive optics", second edition, Academic Press, NY, 1997.
M. Kasper et al., "ALFA: adaptive optics for the Calar Alto Observatory optics, control systems, and performance", Experimental Astronomy 10, 49-73, 2000.

* cited by examiner

*Primary Examiner*—Loha Ben
*Assistant Examiner*—William Choi
(74) *Attorney, Agent, or Firm*—Shalom Wertsberegr; Saltamar Innovations

(57) ABSTRACT

The disclosed invention provides a variable lenslet array system that comprises an acousto-optic medium and at least one acoustic wave generator that is positioned adjacent to the acousto-optic medium. The acoustic wave generator is adapted to generate standing acoustic waves into the acousto-optic medium. The wavelength of the resonant acoustic waves is variable in respect to the medium dimensions or can be varied by changing the driving frequency of the wave generator. The standing acoustic waves within the acousto-optic medium change locally the index of refraction. A wave front of a light beam, which crosses these periodic changes of the index of refraction, becomes corrugated and effectively, an array of lenslets is formed.

11 Claims, 3 Drawing Sheets

(i) 1.256 MHz  (ii) 3.388 MHz

VARIABLE LENSLET ARRAY

FIELD OF THE INVENTION

The present invention relates to lenslet arrays. More particularly, the present invention relates to a variable lenslet array.

BACKGROUND OF THE INVENTION

Measuring wave front distortions is well known in optics, and is essential for adaptive optics. There are a few known wave front sensors that work on similar elements: an optical part that transforms the aberrations into a light intensity variation and determines the response of the wave front sensor, a detector that transforms the light intensity into electrical signals, and a reconstructor that converts the signals into phase aberrations.

The case of adaptive optics will serve here as an example of an application for measurement of wave fronts, but there are other applications which require measuring wave fronts, such as optical shop testing, wafer measurements, and many more. Most astronomical adaptive optics systems use either a Hartmann-Shack wave front sensor or a curvature sensor. There are some cases where the temporal frequency of the turbulence changes with time. These cases are difficult to deal with, since the geometry of the sensors is constant and cannot be easily changed. When the number of photons is limited, it is advantageous to minimize the number of pixels in the detector to improve the signal to noise ratio in each pixel. The best detectors, currently single avalanche photodiodes, are slowly being replaced by continuous cameras such as CCDs (charge-coupled-devices) in order to measure the wave front at different spacings. This is achieved by zooming (changing the magnification) of the relayed aperture onto the wave front sensor or replacing one lenslet array with another, having a different frequency (M. E. Kasper et al., "ALFA: adaptive optics for the Calar Alto Observatory optics, control systems, and performance", Experimental Astronomy 10, 49–73, 2000).

Similar problems arise in ocular adaptive optics, where turbulence is replaced by variable aberrations in the cornea and inside the eye, and where large variations exist between different subjects. Other applications of adaptive optics may require variable spatial and dynamic range sensitivity, such as for open-air communications, microscopy, laser power transfer, and more. Another very important field, in which photons are more plentiful, is measurement of optical surfaces and components, such as for optical shop testing. The wave fronts exiting these systems can have very large aberrations, which need to be measured on a very fine lateral scale. Light from segmented optics, such as in large telescopes, is an extreme case of ill-behaved wave fronts.

There is a need for simple wave front sensor that can measure wave fronts under severe conditions such as low light level, fast scale variations, large aberrations, wide dynamic range, both lateral and in depth, and discontinuities in the wave front. The variable lenslet array of the present invention fulfils the need to sense wave fronts under severe conditions.

SUMMARY OF THE INVENTION

It is an object of the present invention to provide a new and unique variable lenslet array that is formed by acoustic waves passing through an acoustic medium that is confined in an acousto-optic cell. In a preferred embodiment of the present invention, the variable lenslet array may be used for wave front sensing.

It is another object of the present invention to provide a variable lenslet array in which changes in the acoustic wave may form different patterns of lines or curves or a grid periodically shaped in one or more dimensions.

It is yet another object of the present invention to provide a variable lenslet array in which frequency can be altered by electrical or mechanical means or a combination of the two.

Another object of the present invention is to provide a variable lenslet array having multiple focuses (Talbot, Lau, or Dammann grating). The focuses can be repeated along the lateral directions as well as along the optical axis in and after the acousto-optic cell.

Yet another object of the present invention is to provide a variable lenslet array operable under both narrow and wideband light (white light, laser or diode light, monochromatic light, light having variable degrees of spectral and spatial coherence). When speckles exist, especially in narrowband light, they are preferably averaged in space and time.

Another object of the present invention is to provide a variable lenslet array that can be used in a vast variety of applications such as optical communication and processing, optics, engineering, medicine, biology and other industries.

It is thus provided in accordance with a preferred embodiment of the present invention a variable lenslet array system comprising:

acousto-optic medium;

at least one acoustic wave generator positioned adjacent to the acousto-optic medium or in contact therewith, for generating acoustic waves into the acousto-optic medium, wherein the wavelength of the acoustic waves is variable in respect with the medium dimensions;

whereby the acusto-optic medium is modulated by said acoustic wave generator to induce standing waves in said acousto-optic medium, and produce local changes in the optical index of refraction therein to form the effect of a lenslet array.

Furthermore, in accordance with a preferred embodiment of the present invention, the wavelength of the acoustic waves can be varied by changing a driving frequency of the wave generator.

Furthermore, in accordance with a preferred embodiment of the present invention, said acousto-optical medium can be selected from a group of acousto-optical media including water, glycerol, glasses, crystals, certain gases, and other materials well-known to experts in the field of acousto-optics.

Furthermore, in accordance with a preferred embodiment of the present invention, said acousto-optic medium that is not solid, is housed in a container comprising material that will allow acoustic waves to be propagated in it, such as anodized aluminium.

Furthermore, in accordance with a preferred embodiment of the present invention, the container holding the non-solid medium is provided with two substantially transparent windows in order to allow the wave front of the light to cross the acousto-optical medium.

Furthermore, in accordance with a preferred embodiment of the present invention, the acoustic wave generator comprises a piezoelectric material that vibrates according to waveform received from a waveform generator.

Furthermore, in accordance with a preferred embodiment of the present invention, one or more acoustic wave generators are provided for generating acoustic waves into the acousto-optic medium.

Furthermore, in accordance with a preferred embodiment of the present invention, each acoustic wave generator is capable of generating periodical acoustic waves.

Furthermore, in accordance with a preferred embodiment of the present invention, each acoustic wave generator is capable of generating a sinusoidal acoustic wave.

Furthermore, in accordance with a preferred embodiment of the present invention, there is provided a wave front sensing device comprising:

acousto-optic medium;

at least one acoustic wave generator coupled to the acousto-optic medium for generating acoustic waves into the acousto-optic medium, wherein the acoustic waves can be varied by changing a driving characteristic in the wave generator;

optical elements for directing and focusing wave front emanating from said acousto-optic medium onto a detector;

whereby when an aberrated wave front passing through said acousto-optical medium substantially perpendicular to the acoustic wave, a comb of intensity caustics in a generally ordered form is formed, allowing detection of irregularities in the wave front represented as deviations from the generally ordered form caustics.

Furthermore, in accordance with a preferred embodiment of the present invention, a collimation device is provided so as to collimate irradiated light waves into the acousto-optic medium.

Furthermore, in accordance with a preferred embodiment of the present invention, said detector is a camera.

Furthermore, in accordance with a preferred embodiment of the present invention, said detector is a CCD camera.

Furthermore, in accordance with a preferred embodiment of the present invention, said detector is an electronic camera.

Furthermore, in accordance with a preferred embodiment of the present invention, processing means are provided, communicating with the detector, for processing data received from the detector.

Furthermore, in accordance with a preferred embodiment of the present invention, the processing means comprises a frame grabber and a computer.

Furthermore, in accordance with a preferred embodiment of the present invention, the processing means comprises an image digitizer and a computer.

And, in accordance with yet another preferred embodiment of the present invention, there is provided a wave front sensing device for detecting irregularities in a progressing wave front directed through it, the device comprising:

acousto-optic medium;

at least one acoustic wave generator positioned adjacent to the acousto-optic medium for generating travelling acoustic waves into the acousto-optic medium, wherein the travelling acoustic waves can vary by changing the drive characteristics of the wave generator;

a stroboscopic light source having a period that is synchronized with the acoustic period of the traveling waves;

optical elements for focusing and directing the periodic light emanating from said stroboscopic source through said acousto-optic medium;

whereby when the wave front passes through said acousto-optical medium substantially perpendicular to the acoustic wave, a comb of caustics in a generally ordered pattern is formed, allowing detection of irregularities in the wave front represented as deviations from the generally ordered form caustics.

DETAILED DESCRIPTION OF THE INVENTION AND FIGURES

An aspect of the present invention provides a new and unique variable lenslet array. The variable lenslet array consists of two- or three-dimensional array of "lenses", which are in local periodically spaced zones of altered refractive index induced by passing acoustic waves in an acousto-optical medium.

By "acousto-optical medium" it is meant a medium that optical waves irradiated into that medium can pass through it (i.e. it is at least partially transparent to that irradiation) and upon passing of acoustic waves within the medium it affects locally the density of the medium, thus effectively changing locally the refractive index of the medium and influencing the optical waves traversing the medium.

The present invention is explained herein with respect to wave front sensing, but is not limited to that use only. It is possible to use the variable lenslet array of the present invention in various applications requiring the use of lenslet arrays. Similarly, the term acoustic waves should be construed as any waves regardless of frequency and waveform, that are capable of imparting energy to the acousto-optic medium in a manner that will form localized densities therein to change the refractive index in certain locations.

While the specifications herein discuss primarily the modification of wavelength pr frequency, those terms should be construed as extending to modifications in intensity or wave shapes and the like, as such modifications are equivalent for the purpose of this application. Clearly, certain such modifications, alone or in combination, will act equivalently to produce different effective lenslet arrays.

Most known wave front sensors have certain geometry that limits their performance especially when dealing with continuous changes of turbulence. Imparting flexibility characteristics to a wave front sensor involves usually changes in the magnification of the wave front sensor in order to measure the wave front in different spacing.

In the wave front sensor of the present invention, namely the variable lenslet array, flexibility is achieved by passing the wave front through an acoustic-optic cell. If a standing acoustic wave is established within such a cell, the wave front passing through it will suffer from periodic delay and will become corrugated as shown by E. Ribak and E. Gazit in "Simple non-polarizing High-Frequency Modulator for Interferometry", Journal of Physics E 14, 804 (1981).

Figure 1:
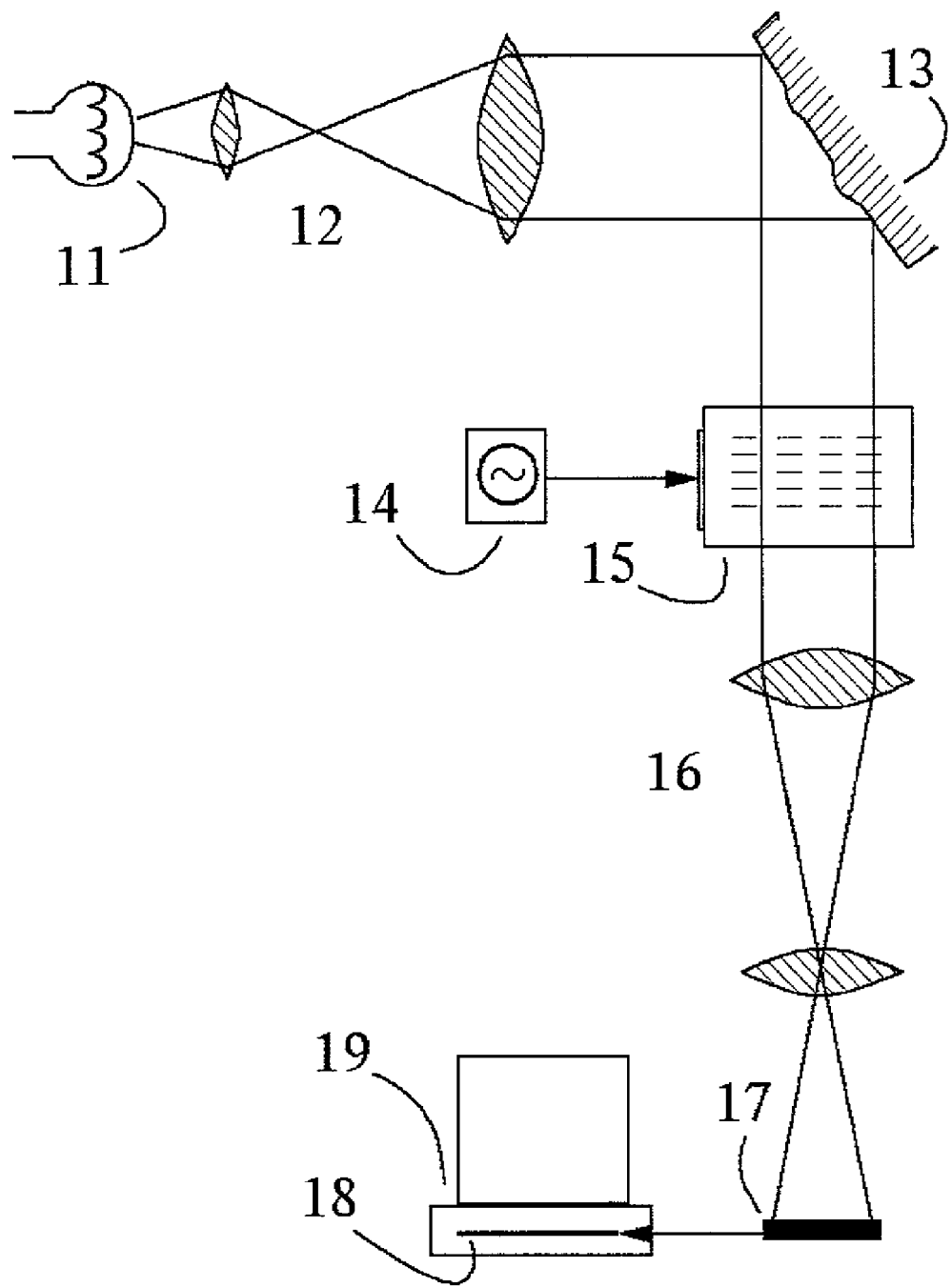
FIG. 1 illustrates a variable lenslet array in accordance with a preferred embodiment of the present invention, incorporated in an optical system designed for wave front sensing.

Reference is now made to FIG. 1 illustrating a variable lenslet array in accordance with a preferred embodiment of the present invention, incorporated in an optical system designed for wave front sensing. The variable lenslet array comprises an acousto-optic cell 15 provided with acousto-optical medium. The type of acousto-optical medium to be used depends on the desired response and resolution. Examples for acousto-optical media are water, glycerol or Lucite (Perspex), glass and a large number of crystals, as well as certain gasses. Acousto-optical materials are well known to experts in the field of acousto-optics (W. G. Driscoll, Ed., Handbook of Optics, McGraw-Hill, N.Y., 1978).

Acousto-optic cell 15 is provided with acoustic drivers, such as piezoelectric disc or two piezoelectric discs attached to either of two orthogonal sides of acousto-optic cell 15. Other angles are possible, for example, a hexagonal cell with 60 degrees between the acoustic beams can establish the necessary acoustic waves. An acoustic waveform generator 14 transfers an acoustic waveform to the acoustic driver so as to allow an acoustic wave to pass through the acousto-optical medium confined in acousto-optic cell 15. The acoustic wave driver can be also a loudspeaker at high frequencies. Establishing a standing sound wave within acousto-optic cell 15 forms a simple lenslet array as will be comprehensively explained below. If the acousto-optic medium is a liquid, the liquid is confined in a cell and transparent windows are provided in order to allow the light to pass through it. If the acousto-optic material is a solid, the acoustic driver can be evaporated or attached onto the acousto-optic medium. In some cases, the acousto-optic material is also piezoelectric and can be driven directly through the medium. The wavelength of the acoustic waves can be varied also by changing the dimensions of the medium, for example, providing a cell having a piston that can change the effective length of the cell.

In order to conveniently sense a wave front, the wave front preferably passes substantially perpendicular to the acoustic wave. In the embodiment shown in FIG. 1, the wave front is initiated from a light source 11. The light from light source 11 can be coherent or incoherent, white or monochromatic. The light goes through a collimation system 12 in order to generate a collimated beam. The collimated beam passes through, or is reflected off a device with a perturbation to be measured, in this case an aluminized mirror 13. The resulting wave front is passed through acousto-optic cell 15.

Figure 2:
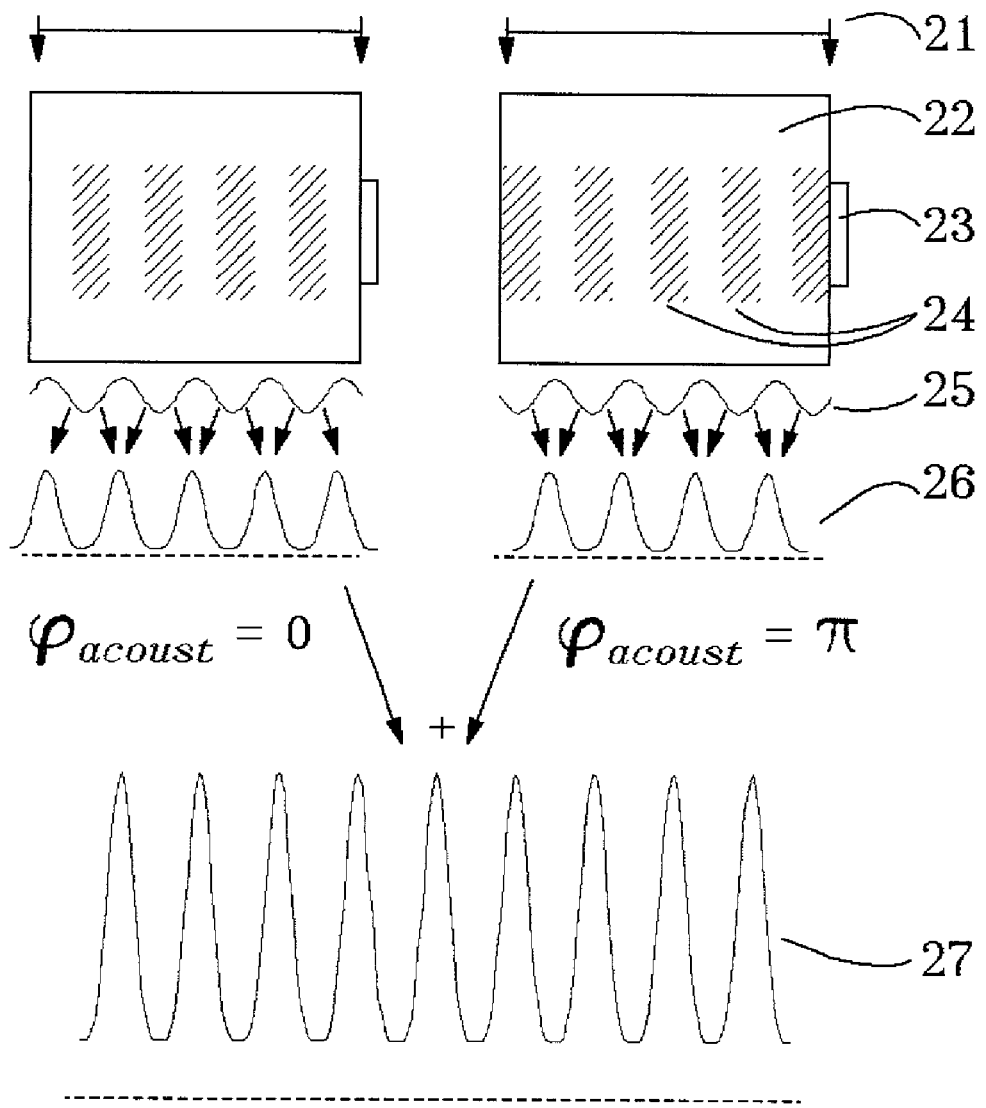
FIG. 2 depicts a schematic illustration of a wave front passing through an acousto-optic cell in accordance with a preferred embodiment of the present invention, and the resulting intensity pattern.

Reference is now made to FIG. 2 depicting a schematic illustration of a wave front passing through an acousto-optic cell in accordance with a preferred embodiment of the present invention, and the resulting intensity pattern. An input wave front and rays 21 are irradiated so as to pass through an acousto-optic cell 22. As mentioned herein before, if a standing wave is established within such a cell, the wave front passing through it will suffer from a periodic delay and will become corrugated. Therefore, acousto-optic cell 22 is provided with acoustic driver 23 that is adapted to generate a standing wave (sound wave) within acousto-optic cell 22. A simple lenslet array can be created from two crossed lenticular cylindrical lens arrays. In a similar manner, in the flexible realization shown in FIG. 2, two standing waves are being established substantially perpendicular to rays 21. The direction of propagation of the acoustic beams is essentially parallel to wave front 21, but can be at other angles to it. At a predetermined distance down the optical beam, each sound wave creates a comb of caustics 24 (periodic changes in the intensity of the light beam). The caustic effect can be found for example on the bottom of pools, appearing as a bright pattern, where it is created due to localized variations in the water—an effect the present invention utilizes and harnesses in an orderly manner.

An illustration of two orthogonal combs is shown in FIG. 2, side by side. Output wave front and rays 25 are illustrated as progressing and outgoing from acousto-optic cell 22, producing an integrated intensity pattern 26 at the plane where the caustics are visible. The two orthogonal combs add up to an array of caustics spots, similarly to spots behind a conventional lenslet array, and generate a total intensity pattern 27. Intensity pattern 27 reflects any distortions in the wave front that pass through the acousto-optic cell.

Returning to FIG. 1 illustrating the variable lenslet array, the related optical system is described. In order to image and record the resulting intensity pattern, an optical system 16 is provided in the focal path of the output wave front and rays. Optical system 16 comprises lenses (or mirrors) that optically transfer the output wave front and rays into a camera, preferably a CCD camera 17. Any other camera is also possible, a 35 mm or other format film camera, a number of detectors, or another type of an electronic camera. The task of this optical system is to minimize all other optical aberrations not related to the measured perturbations, and to relay the image of the beam with as few errors as possible. In very simple cases, even a naked eye suffices in order to detect perturbations. Preferably, the arrangement of acousto-optic cell 15 relative to the lenses of optical system 16 is variable. The acousto-optic cell can be placed in front, between, or behind the lenses. According to the configuration, the effective focal length of the caustics is changed in order to alter their contrast. This can be done by moving the lenses and by the strength and the length of the acoustic wave that governs the focal length of the effective lenslets.

The resulting intensity pattern may be imaged on an array of detectors as well as on a light sensitive surface (in a camera). The information is then transferred to a frame grabber or image digitizer 18 and the data collected is processed or stored on a computer 19.

An experimental system was built substantially according to the embodiment shown in FIG. 1. A rectangular, nearly cubic box having a side dimension (length and width) of about 50 mm and a wall thickness of about 2 mm was constructed from aluminium in order to form an acousto-optic cell. The cell walls were anodized to reduce corrosion. Two transparent windows were provided on two opposite sides of the box, and two piezoelectric discs were attached to two orthogonal sides of the box, as acoustic drivers. The acousto-optical cell was filled with water serving as the acousto-optic medium. A cosine waveform of up to 20 V and 0.1 A (p-v) was applied to either or both discs. By varying the frequency of the acoustic drivers, many standing wave resonances were immediately visible between 300 kHz and 8 MHz. Due to the rectangular structure of the box, not all resonances appeared at both directions simultaneously. Above 4 MHz, the contrast of the caustics diminished due to spectral spreading, but were still visible at higher magnification. To view the effect of aberrations on the caustics, a collimated beam of white light was reflected off an aluminized mirror, on which three small hillocks, each of 1.2 micrometer height and 1 millimeter wide, were evaporated. The hillocks represent distortions in the wave front to be reflected off the mirror and passed through the acousto-optic cell. Two lenses transferred the light coming from the mirror onto a commercial CCD. The spatial frequency of the variable lenslet array, inversely linear with the temporal frequency of the standing sound waves, was 0.3–3 mm.

Figure 3A:
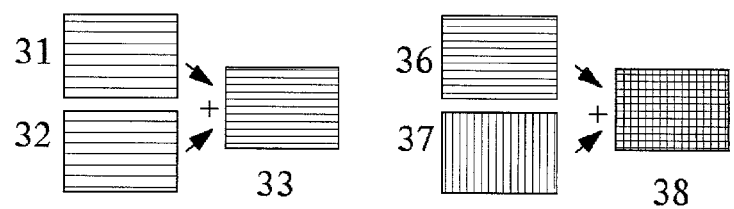
FIG. 3a depicts a schematic illustration of theoretical caustics lines from two phases and two directions.

Reference is now made to FIG. 3a depicting a schematic illustration of theoretical caustic lines from two phases and directions.

In FIG. 3a caustic lines at zero acoustic phase 31 and caustic lines at π (180 degrees) acoustic phase 32 add up to caustic lines 33. When the caustic lines are produced from different directions, the result is in the shape of a grid. Caustic lines from x direction 36 are combined with caustic lines from the y direction 37 to produce resultant caustic lines 38.

Figure 3B:
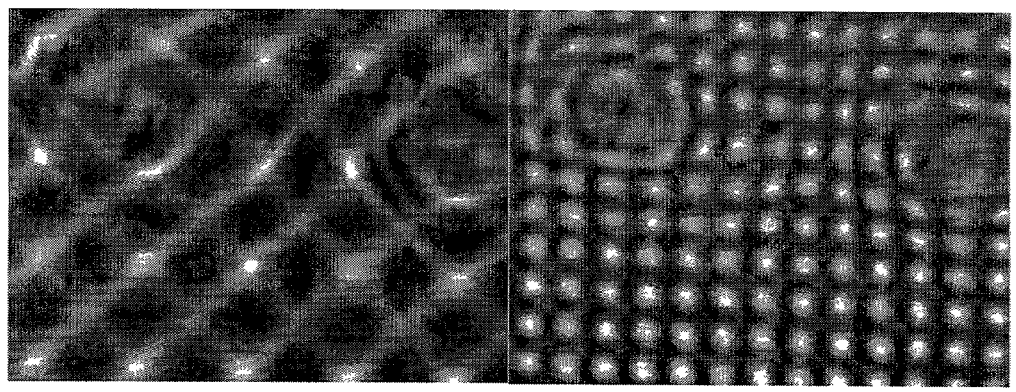
FIG. 3b depicts a cross pattern of bright spots representing caustics of an experimental system driven at (i) 1.256 MHz and (ii) 3.388 MHz.

FIG. 3b illustrates a cross pattern of bright spots formed in the experimental system described herein. The standing acoustic waves are emanated from the drivers at 45° and 135° to produce the caustics. At 1.256 MHz (i) (the less dense grid in FIG. 3b) the caustics are weaker due to low power or imperfect focusing. At 3.388 MHz (ii), (the more dense grid) the caustics are clear. Two protrusions of 1.2 micrometer height and 1 millimeter width on the mirror are seen on the visible grid as bends. Other artifacts may be due to imperfections on the optical system.

Analysis of the grid pattern to yield the wave front aberrations is made similar to the analysis of the Hartmann or Hartmann-Shack device, which is well known to a person skilled in the art. These details can now be found in textbooks such as Robert K. Tyson, "Principles of adaptive optics", second edition, Academic Press 1997.

The scope of the present invention is also not limited to the described acousto-optical materials. It is optional to use an acousto-electro-optical medium such as PLZT. In this case, voltage is applied directly to the acousto-electro-optical medium. The system may also operate by traversing light back and forth through a lenslet array, rather than passing light therethrough.

Variable lenslet arrays based on the preferred embodiment showed herein or the principles described in the present specifications can be used in a variety of applications, and the scope of the present invention is not limited to wave front sensing alone.

The term lenslet arrays is a simplifying term, and it is clear from the description herein that it stems from periodic fluctuations in the index of refraction of the acousto-optic material, where these periodic fluctuations can be a result of a standing acoustic wave or of a travelling acoustic wave. The resulting periodic intensity pattern can be detected with a slow detector in the case of standing acoustic waves. A slow detector means that many cycles occur during the integration time of the camera frame. With travelling acoustic waves the intensity pattern is also travelling, and can be detected by a fast detector synchronized with the waves. Alternatively, the travelling intensity pattern can be frozen with pulsed light synchronized with the waves and imaged with a slow camera.

It should be clear that the description of the embodiments and attached Figures set forth in this specification serves only for a better understanding of the invention, without limiting its scope.

It should also be clear that a person skilled in the art, after reading the present specification could make adjustments or amendments to the attached Figures and above described embodiments that would still be covered by the present invention.

The invention claimed is:

1. A wave front sensing device for detecting irregularities in a progressing wave front directed through it, the device comprising:

acousto-optic medium;

at least one acoustic wave generator coupled to the acousto-optic medium for imparting acoustic waves into the acousto-optic medium, wherein the acoustic waves characteristics are modifiable;

optical elements for directing and focusing the wave front passing through said acousto-optic medium onto a detector;

a collimation device for collimating radiation through the acousto-optic medium whereby when the wave front passes through said acousto-optical medium substantially perpendicular to the acoustic wave, a comb of detectable caustics in a generally ordered pattern is formed, allowing detection of irregularities in the wave front represented as deviations from the generally ordered form caustics.

2. A wave front sensing device for detecting irregularities in a progressing wave front directed through it, the device comprising:

acousto-optic medium:

at least one acoustic wave generator coupled to the acousto-optic medium for generating traveling acoustic waves therein, wherein the traveling acoustic waves can be varied by changing a driving frequency of the wave generator;

a stroboscopic light source having a period that is synchronized with the acoustic period of the traveling waves;

optical elements for focusing and directing the periodic light emanating from said stroboscopic source through said acousto-optic medium whereby when the wave front passes through said acousto-optical medium substantially perpendicular to the acoustic wave, a comb of detectable caustics in a generally ordered pattern is formed, allowing detection of irregularities in the wave front represented as deviations from the generally ordered form caustics.

3. The device as claimed in claim 2, wherein the optical elements contain abberations with irregularities to be measured.

4. A method for determining spatial perturbations in a wave front of a light beam, the method comprising:

providing an acousto-optical medium coupled to at least one of a plurality of acoustic wave generators having driving characteristics for generating acoustic waves within the acousto-optical medium;

generating standing acoustic waves of predetermined characteristics within the acousto-optical medium so as to create a grid of localized areas of varying optical refractive index thus forming a dynamic lenslet array;

irradiating the light beam through the acousto-optical medium and examining the light emerging from the acousto-optical medium to determine said spatial perturbation.

5. The method of claim 4, wherein the characteristics of the waves are changed by modulating the driving characteristics of said at least one acoustic wave generator.

6. The method of claim 4, further comprising the step of directing and focusing the light beam passing through said acousto-optic medium onto a detector.

7. A method for determining spatial perturbations in a wave front of a light beam, the method comprising:

providing an acousto-optical medium coupled to at least one of a plurality of acoustic wave generators having driving characteristics for generating acoustic waves within the acousto-optical medium;

generating acoustic waves of predetermined characteristics within the acousto-optical medium so as to create a grid of localized areas of varying optical refractive index thus forming a dynamic lenslet array;

providing a directing periodic light synchronized with the acoustic periods of the acoustic wave into the acousto-optical medium;

irradiating the light beam through the acousto-optical medium and examining the light emerging from the acousto-optical medium.

8. A method for creating a grid of focal points in a light beam, the method comprising the steps of:

providing an acousto-optical medium coupled to at least one of a plurality of acoustic wave generators having driving characteristics for generating acoustic waves within the acousto-optical medium;

generating acoustic waves of predetermined characteristics within the acousto-optical medium so as to create a grid of localized areas of varying optical refractive index thus forming a dynamic lenslet array;

irradiating a light beam through the grid of localized areas of varying optical refractive index of the acousto-optical medium, thereby creating a grid of focal points in the light beam.

9. The method of claim 8, further comprising varying the frequencies of the acoustic waves to vary the spatial distribution of the focal points.

10. The method of claim 8, further comprising irradiating the dynamic lenslet array with a stroboscopic light synchronized with the acoustic waves.

11. The method of claim 8, wherein optical elements are provided in the optical path of the light beam.

* * * * *